United States Patent [19]

Vogelsinger

[11] 4,069,401
[45] Jan. 17, 1978

[54] ACOUSTICAL FRICTIONAL RESISTANCE CONSTRUCTION AND APPARATUS FOR MANUFACTURING AN ACOUSTICAL RESISTANCE AND AN ASSOCIATED MAGNETIC SYSTEM

[75] Inventor: Fritz Vogelsinger, Vienna, Austria

[73] Assignee: AKG Akustische u. Kino-Gerate Gesellschaft m.b.H., Austria

[21] Appl. No.: 728,288

[22] Filed: Sept. 30, 1976

[30] Foreign Application Priority Data

Oct. 2, 1975 Austria ................................ 7537/75

[51] Int. Cl.² .......................... H04R 1/20; H04R 13/00
[52] U.S. Cl. ................................. 179/115 R; 179/180
[58] Field of Search ................ 179/180, 115 R, 114 R Primary Examiner—George G. Stellar
Attorney, Agent, or Firm—McGlew and Tuttle

[57] ABSTRACT

An acoustical frictional resistance for electroacoustical transducers, comprises a blank sheet having a first plurality of impressions on its one surface which partially extends into the sheet and having an opposite surface with a second plurality of impressions which extend partially into the opposite surface and meet the first plurality of impressions. The first and second impressions are made so that they partially overlap and define acoustical passages through the sheet at the overlapping areas. The resistances are advantageously made of a thermoplastic material and they may be incorporated in a magnetic system, preferably by molding them integrally with an encapsulation of a magnet and its associated pot and by simultaneously forming passages in which the frictional resistances are placed. An apparatus for forming the individual resistances advantageously includes two separable mold parts defining a cavity therebetween into which the blank material may be placed or may be fed in the form of a plasticized material and which includes a punch and a counter-punch arranged in opposition and mounted for relative rotation about a concentric circle so that they may engage into the blank from respective opposite sides which are offset by amounts to form overlapped areas which are impressed deep enough so that they communicate from one side to the other and form acoustical resistance passages.

9 Claims, 7 Drawing Figures

ACOUSTICAL FRICTIONAL RESISTANCE CONSTRUCTION AND APPARATUS FOR MANUFACTURING AN ACOUSTICAL RESISTANCE AND AN ASSOCIATED MAGNETIC SYSTEM

FIELD AND BACKGROUND OF THE INVENTION

This invention relates in general to the construction of electroacoustical transducers and, in particular, to a new and useful acoustical frictional resistance construction and apparatus for making such a construction, and to a magnetic system embodying the resistances.

DESCRIPTION OF THE PRIOR ART

Electroacoustic transducers, regardless of whether they are designed as sound transmitters or sound receivers, require acoustic frictional resistances whether for damping a peak in the frequency course or for the production of a phase-rotating element for the formation of a directional pattern, etc.

The known frictional resistances represented mostly separate elements which were mounted at the desired point in the electroacoustic transducer. The material used were felts, non-woven fabrics or woven fabrics, particularly textile fabrics, etc. Occasionally, however, finely perforated metal foils were used even though their production is rather complicated when a maximum of uniformity is required.

It has also been suggested to bundle fibers of small diameter, for example, glass fibers, where the channels resulting between the fibers formed the acoustic frictional resistance. Frictional resistances of plastic material are also known, where a circular cylindrical bore is provided in the partition of a transducer between the front and rear side of the diaphragm, into which is inserted a plastic cylindrical body whose diameter is selected slightly smaller than the diameter of the bore in the plastic partition. The acoustic frictional resistance was then formed by the gap between the wall of the bore, and the surface area of the inserted cylindrical body. Such an acoustic frictional resistance has the advantage that it can be produced simultaneously with the partition and other parts of the transducer which are also made of plastic. It is only necessary to take measures during the injection molding which permit the formation of straps to hold the cylindrical body in the bore, which measures are also mentioned in the known proposal. Such frictional resistances of plastic can be readily used and easily produced in some cases, but they have the disadvantage that a new molded part must be produced when the friction value changes, so that the production costs of the transducer are increased. In particular, it is difficult to impart to the above described known frictional resistance a high friction value or to make it high-ohmic in analogy to the electric resistance, since it is difficult in practice to produce the circular air gap determining the resistance value at random, because the molding element keeping the air gap free during the injection molding would have to have such a low wall thickness that it would not withstand the forces occuring during the injection of the thermoplastic compound without deformation.

SUMMARY OF THE INVENTION

The object of the invention is to provide a frictional resistance of plastic which can have both very high resistance values and which does not require a sensitive injection mold for its production. The device, according to the invention, for the production of such a resistance has no extremely sensitive parts which would be liable to become deformed during the injection molding, and it has the further advantage that it can be so designed that different frictional resistances can be obtained with a forming device, merely by shifting a punch and counterpunch relatively. Another advantage of the device according to the invention is that it can be designed as part of an injection mold which serves to coat the magnet system of an electroacoustic transducer with plastic or to embed it in plastic, and wherein the frictional resistances necessary for the transducer can be formed at the same time.

If only one separate acoustic frictional resistance is to be produced, the device according to the invention can be so designed that it supplies a large surfaced web from which the desired molds for frictional resistances are either cut-out or punched-out. For practical tests, it may be of advantage to make such large-surfaced webs with different specific resistance values, and to keep them in stock, so that the optimum resistance value for a certain frictional resistance can be determined simply and rapidly when an electroacoustic transducer is developed or tried out. Since thermoplastic plastics are practically climate-resistant and show great resistance to aging as well as sufficient mechanical resistance, the corresponding values of the specific resistance can be indicated once and for all for the above mentioned large-surfaced webs, so that no time consuming measurements are required later on.

The frictional resistance of plastic material according to the invention is characterized in that a web carries on both sides numerous impressions which partly overlap and which form passages for the sound at the overlapping points. Preferably, the impressions on one side are arranged to coincide with the impressions on the other side, but are staggered as a whole by a fixed amount so that partial overlappings, which result in passages, are formed.

The device according to the invention for the production of such an acoustic frictional resistance is geared primarily to injection molding and is characterized substantially in that the injection mold has at least two, but preferably a greater number of, opposing dies in opposite tool molding plates which can be displaced or rotated relative to each other, these dies having in the closed mold common contact surfaces extending in a plane, whose dimension can be adjusted between zero and a maximum value by displacing or rotating the tool molding plates or parts thereof.

In accordance with another feature of the invention, the tool molding plates or parts thereof carrying the dies are part of an injection mold which is designed to embed the magnet system of an electroacoustic transducer in plastic or to coat it with plastic by injection molding.

The adjustment of one tool molding plate or a part thereof which carries the dies can be effected according to the invention by means of an eccentrically arranged sleeve engaged over a threaded spindle. The use of a threaded spindle permits a very accurate adjustment that is always reproducible, which is very important for the manufacture, particularly when a corresponding scale arrangement with a pointer is connected with it.

Principally, it is sufficient to provide the device with a top and bottom die in the form of cylindrical pins. In this manner, very high resistance values can be achieved, if only a slight overlapping in the contact surface of the dies is set, which are only rarely required.

In general, a plurality of such cylindrical or other dies will be provided with plane end faces. Another feature of the invention consists in that a plurality of opposing dies are provided which are so arranged that their end faces touch each other completely in one plane in one position of the displaceable or rotatable tool molding plate, or of the moving part carrying the dies, while they are, in another position, at most tangent to each other in the same plane. This way, an areal frictional resistance can be produced, whose resistance is directly proportional to its area, even if the dimensions of the part used are very small.

Finally, an expedient design consists in that an adjustable insert is provided in the upper tool part of the injection mold with one or more pin-shape dies to which arrangement correspond pin-shape dies in the fixed bottom tool part or vice versa.

Under certain circumstances, it may be of advantage to roughen the faces of the dies ectending in the contact plane, to raster them, or to pattern them in some manner.

The invention is not limited to a device with pin-shape cylindrical dies. The dies can also be designed for reasons of strength, for example, as truncated cones, prisms, etc.

Accordingly, it is an object of the invention to provide an acoustic frictional resistance for electroacoustical transducers which comprise a thermoplastic sheet or blank which has a first plurality of impressions on one surface which partially extend into the sheet and which has an opposite surface with a second plurality of impressions which extends into the opposite surface and meets with the first plurality of impressions and, wherein, the first and second impressions are overlapped partially so as to define acoustical passages through the sheet at the overlapping areas.

A further object of the invention is to provide a magnetic system which includes a magnet in a pot which is enclosed by a plastic encapsulation which includes a plurality of passages having frictional resistances therein which are formed by impressions made on opposite sides of a frictional resistance blank which overlap and which connect within the blank at the overlapped areas.

A further object of the invention is to provide a device for forming acoustical frictional resistances from a blank which comprises a punch and a counterpunch mounted on respective housing parts so that they are axially movable toward and away from a blank position therebetween to form impressions in the respective opposite side faces thereof and also mounted so that they may be displaced in directions at right angles to the axial movement direction so that they may be offset relatively and which form, when they are engaged with the blank, impressions which extend inwardly from respective opposite sides, which overlap and which communicate at their overlapped areas by passages extending through the blank.

Another object of the invention is to provide an acoustic frictional resistance and an apparatus for making such a resistance which is simple in design, rugged in construction and economical to manufacture.

The various features of novelty which characterize the invention are pointed out with particularity in the claims annexed to and forming a part of this disclosure.

For a better understanding of the invention, its operating advantages and specific objects attained by its uses, reference should be had to the accompanying drawings and descriptive matter in which there are illustrated perferred embodiments of the invention.

DESCRIPTION OF THE PREFERRED EMBODIMENTS

Figure 1:
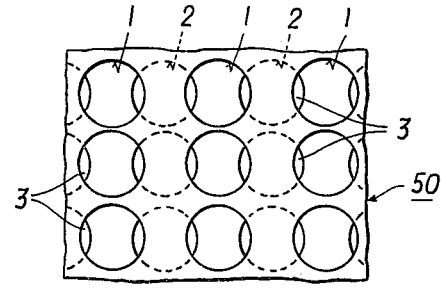
FIG. 1 is a top plan view of an acoustic frictional resistance constructed in accordance with the invention.
Figure 2:
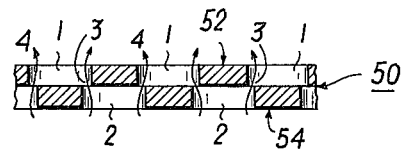
FIG. 2 is a cross-sectional view of the resistance shown in FIG. 1.

Referring to the drawings in particular, the invention embodied therein in FIG. 1, comprises a frictional acoustic resistance sheet or blank 50 having respective opposite faces or surfaces 52 and 54 on which impressions 1 are formed which extend inwardly into the blank 50 by an amount such that the impressions meet and define passages 3 at areas in which the impressions overlap. In the embodiment shown in FIGS. 1 and 2, the impressions 1 and 2 are of circular form so that cylindrical recesses are formed with partial overlaps which form the resistance passages 3. In this embodiment, the size and configuration of the impressions 1 and 2 are made identical. Passages 3 are greatly exaggerated in the figures and they form the frictional resistance proper. The embodiment of FIGS. 1 and 2 shows a case in which the spacing between the impressions is made smaller than the diameters of the impressions so that there are two resistance passages 3 per impression set. If impressions 1 are displaced relative to impressions 2, only one passage would be formed at a single overlapping area. Thus, depending upon the degree of displacement of the impressions from the respective opposite surfaces, various sizes can be obtained for the passages 3 and a maximum is achieved when the impressions 1 correspond with the impressions 2.

In the embodiment of FIG. 2, the impressions are made with cylindrical dies and arrows are indicated for the passage of sound through the passages 3. It can be seen that the frictional resistance, according to the invention, is substantially without mass load because of its low thickness in the range of the boundaries of the passages and since no formation of air columns is possible.

Figure 3:
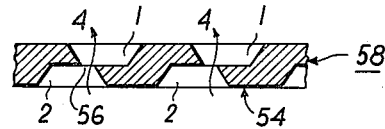
FIG. 3 is a view, similar to FIG. 2, of another embodiment of the invention.

Other die forms or shapes can be used, for example, a truncated conical impression, as shown in FIG. 3. This construction makes the passages 56 of the blank 58 passages which are defined by sharp cutting edges between which it is not possible to refer to an air volume loading of the resistance with a mass component. The indicated embodiments of frictional resistances are naturally not the only possibilities. It is advantageous to select a size and shape of impression which will give the most satisfactory results in each installation. The simplest design of frictional resistance, according to the invention, is one where the top and bottom impressions 1 and 2 are provided, and both overlap so far that a straight or curved slot passage is formed, depending on the form of the impressions.

Such a design is particularly expedient when both a frictional resistance and an encapsulation of a magnetic system are to be produced simultaneously.

Figure 4:
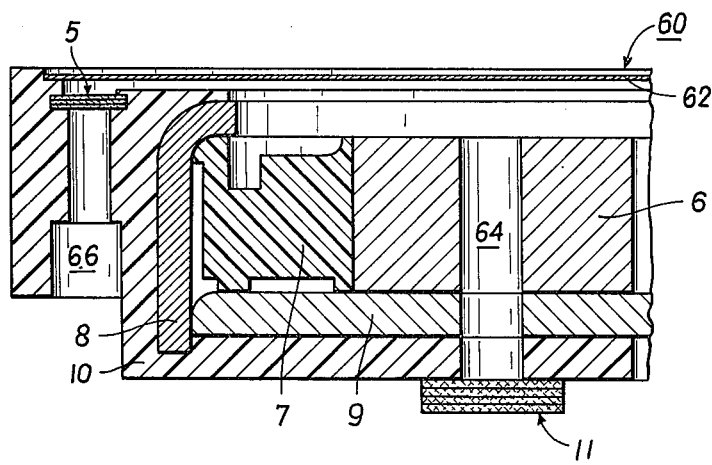
FIG. 4 is a partial sectional view of a magnetic system embodying the invention.

In the embodiment of FIG. 4, there is shown a magnetic system of an electrodynamic transducer, generally designated 60. The transducer includes a magnet 6 which is provided with a circumferential plastic coating 7 and which is arranged in a pot 8 and is then encapsulated by a plastic 10, along with a diaphragm 62 and bottom plate 9. The encapsulation 10 is produced by a plastic injection-molded coating. In such a system, a frictional resistance 5 is inserted into the mold in a conventional manner before the encapsulation is completed. A frictional resistance 11 terminates a cylindrical passage 64 which extends to the exterior of the device and this can also be arranged in a manner similar to the frictional resistance 5 which is located in a passage 66.

Figure 5:
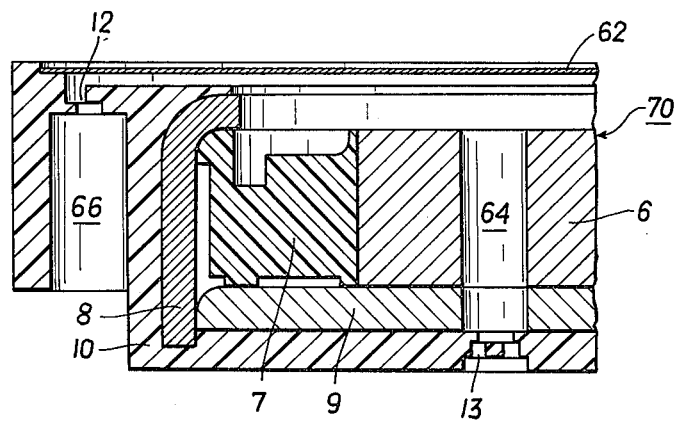
FIG. 5 is a view, similar to FIG. 4, of another embodiment of magnetic system.

In the embodiment of FIG. 5, similar parts are similarly designated, for a magnetic system, generally designated 70, but in this embodiment, the encapsulation 10' is formed so as to form frictional resistances 12 and 13 in passages behind a diaphragm 62.

Figure 6:
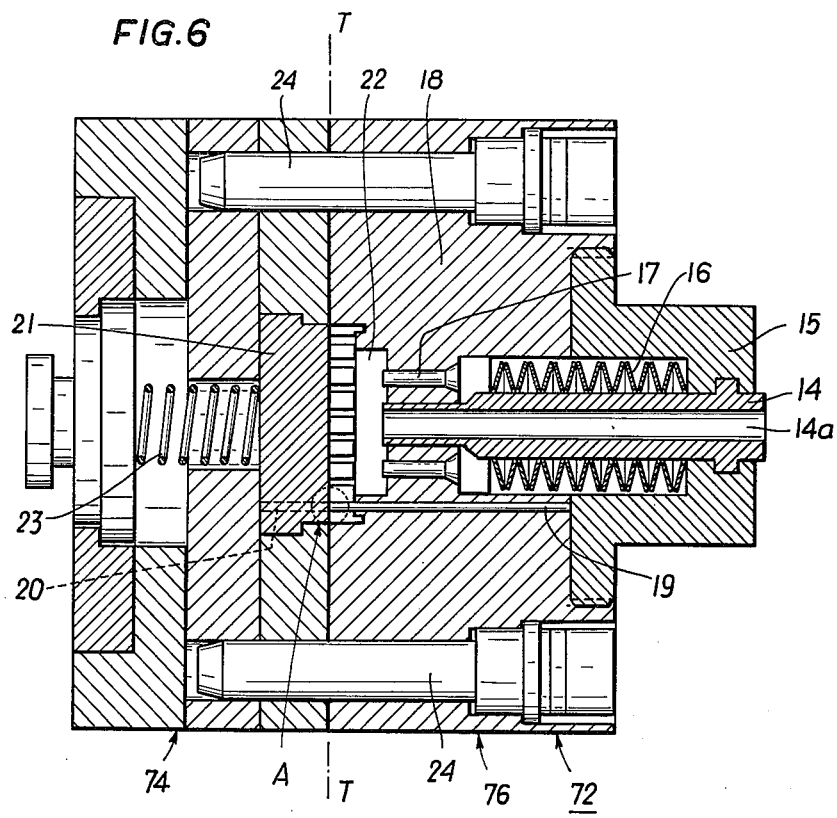
FIG. 6 is a partial sectional view of an apparatus for producing frictional resistances.
Figure 6A:
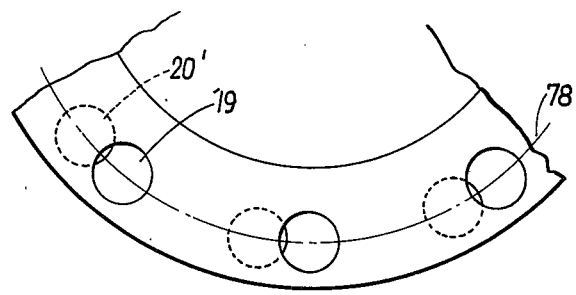
FIG. 6a is a schematic cross-section indicating the manner in which the punch and counterpunch may be offset relative to each other.

As shown in FIG. 6, a simple apparatus for manufacturing acoustical resistances from blanks or of plastic sheets, comprises in the embodiment illustrated, an acoustic sheet-forming device and mold, generally designated 72, which includes separable mold parts, generally designated 74 and 76, which are separatable along a separating plane T—T. The one part 76 includes a so-called starting nozzle 14, which is held by a nut 15 and which has a passage 14a therethrough for the passage of plastic material, for example. A cup spring 16 is provided for the pressure plate, having pressure dies 17, which is enclosed by an injection mold part 18. For the production of the impressions for the frictional resistance, part 18 carries a punch 19 which is axially displaceable by an amount equivalent only to a portion of the thickness of the blank and such that it meets the displacement of a counterpunch 20 mounted in the part 74. In the embodiment illustrated, the punch 19 and the counterpunch 20 are mounted for movement at right angles to the axial displacement movement, for example, about a common circle 78, as indicated in FIG. 6a. The punch 19 and counterpunch 20 may be moved in relative separating and closing movement directions along circle 78 so that they form impressions on respective opposite surfaces of the blank which overlap, as indicated by the counterpunch impressions 20' and the punch depressions 19'. The greatest cross-section is achieved if the punch circles 19' are opposite to, and coincide with, the counterpunch circles 20'. If the punches are so far apart that they overlap very little in their circumferential circle 78, the maximum useful resistance value is achieved shortly before the complete closure of the overlap.

The mold part 74 carries a pressure plate 21 which is pressed by compression spring 23 against the other tool part. Pressure plate 21 also forms a wall of a chamber 22 which serves to receive the magnetic system of a whole transducer, similar to that indicated in FIGS. 4 or 5.

Guide pins 24 ensure exact guidance of the mold part 76.

Other embodiments of the device can be provided additionally, for example, an adjusting device which permits an adjustment of the required rotation of the punch 19 relative to the counterpunch 20. For this purpose, an eccentric bushing is provided, (but has not been shown), which is moved by a threaded spindle (not shown). A scale can be assigned to the spindle to indicate the particular settings so that precise regulation of the overlap may be controlled.

The parts 74 and 76 are advantageously mounted to permit relative movement of the punch 19 and counterpunch 20 so that their end faces coincide in one plane in one position, or they may be moved away from each other so that they are at the most tangent to each other in an opposite end position. Punch 19 and counterpunch 20 may have any desired geometrical form and advantageously include free flat ends which extend at the end position into a common plane. Advantageously, the surfaces of the punch and the counterpunch which are facing each other are provided with roughened, rastered or similarly patterned surfaces.

While specific embodiments of the invention have been shown and described in detail to illustrate the application of the principles of the invention, it will be understood that the invention may be embodied otherwise without departing from such principles.

What is claimed is:

1. An acoustical frictional resistance for electroacoustical transducers, comprising a thermoplastic sheet having one surface with a first plurality of impressions partially extending into said sheet, and having an opposite surface having a second plurality of impressions extending partially into said opposite surface and meeting said first plurality of impressions in said sheet, said first and second plurality of impressions overlapping partially and defining acoustical passages through said sheet at the overlapping areas.

2. An acoustical frictional resistance, according to claim 1, wherein said impressions are cylindrical.

3. An acoustical frictional resistance, according to claim 1, wherein said impressions are truncated conical impressions.

4. An acoustical frictional resistance, according to claim 1, wherein said thermoplastic sheet comprises an encapsulation for a magnetic system.

5. An acoustical frictional resistance, according to claim 4, including a diagram encapsulated by said magnetic system, said magnetic system including a magnet having a magnetic pot arranged therearound and spaced therefrom by a plastic coating and having at least one passage extending outwardly from said diaphragm and including a separate sheet held by said encapsulation in said passage, said separate sheet having said first and second opposite impressions and defining said acoustical passages therethrough.

6. An acoustical frictional resistance, according to claim 4, wherein said encapsulation includes a diaphragm held thereby in spaced relationship to said magnetic system and having a passage extending outwardly from said diaphragm and including a sheet extending across said passage having said one surface and said opposite surface with said first and second impressions therein.

7. A magnetic system comprising a magnet having an annular exterior surface, a plastic coating on said surface, a pot surrounding said plastic surface, a bottom plate abuting said magnet and said pot, an encapsulation around said pot and said pate, a diaphragm held by said encapsulation, at least one passage extending through said encapsulation from said diaphragm and means defining an acoustical frictional resistance in said passage comprising a thermoplastic sheet having one surface with a first plurality of impressions on said one surface partially extending into said sheet and having an opposite surface having a second plurality of impressions extending partially into said opposite surface and meeting said first plurality of impressions in said sheet, said first and second plurality of impressions overlapping partially and defining acoustical passages through said sheet at the overlapping areas.

8. A magnetic system, according to claim 7, wherein said thermoplastic sheet is defined by said encapsulation.

9. A magnetic system, according to claim 7, wherein said thermoplastic sheet includes a sheet held in said encapsulation in said passage.